G. H. HOLLM.
TOOL HOLDER SECURING DEVICE.
APPLICATION FILED APR. 15, 1907.
922,429.
Patented May 18, 1909.
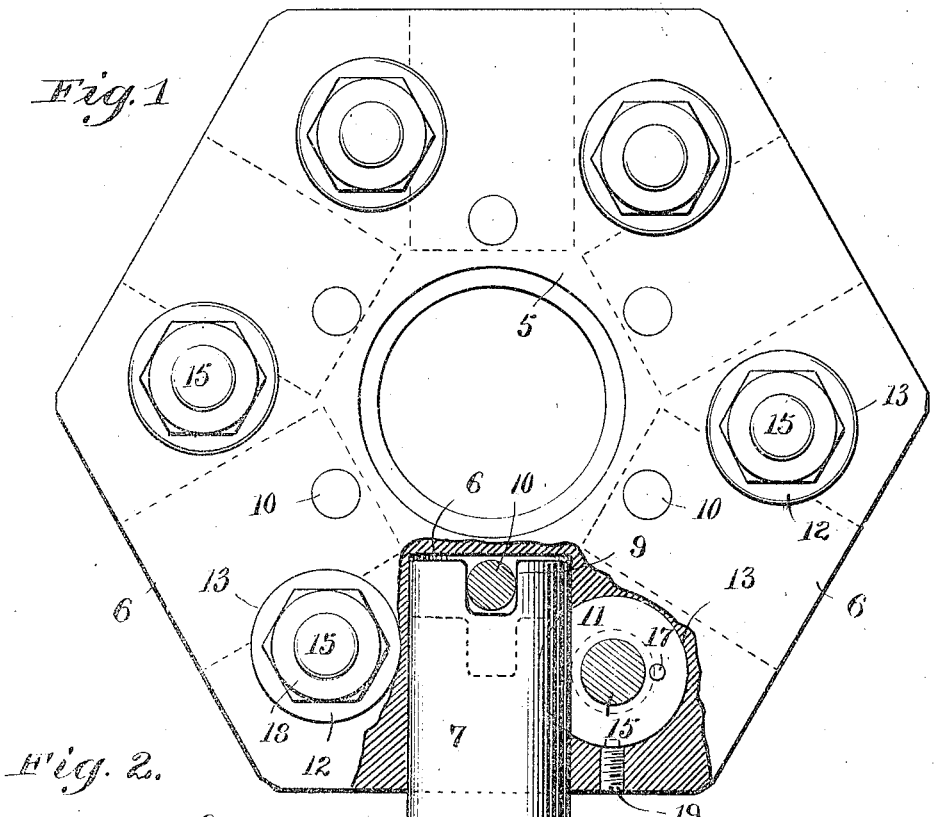
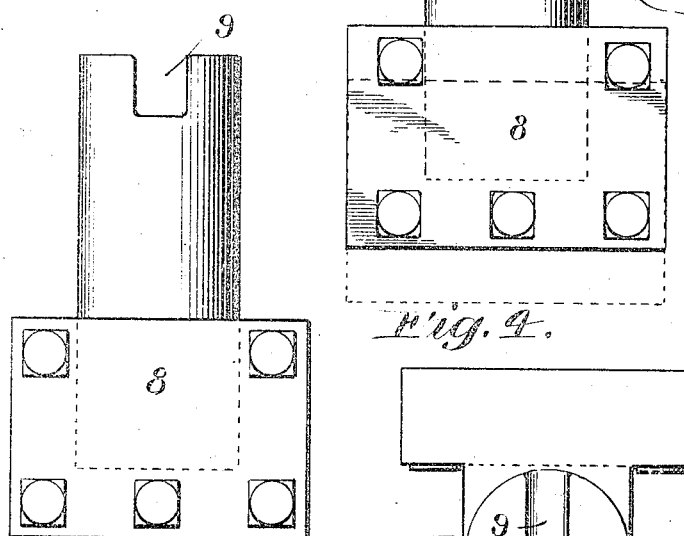
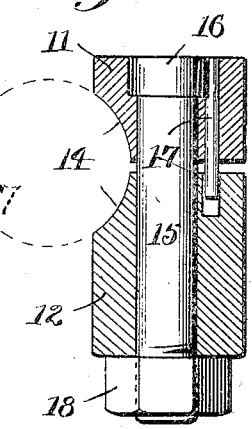
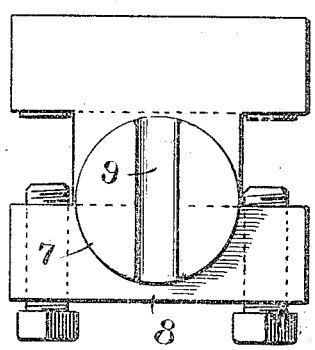
Witnesses
Inventor
Gustav H. Hollm
By
Chamberlain & Newman
Attorneys

UNITED STATES PATENT OFFICE.

GUSTAV H. HOLLM, OF BRIDGEPORT, CONNECTICUT.

TOOL-HOLDER-SECURING DEVICE.

No. 922,429.  Specification of Letters Patent.  Patented May 18, 1909.

Application filed April 15, 1907. Serial No. 368,434.

*To all whom it may concern:*

Be it known that I, GUSTAV H. HOLLM, a citizen of the United States, and resident of Bridgeport, in the county of Fairfield and State of Connecticut, have invented certain new and useful Improvements in Tool-Holder-Securing Devices, of which the following is a specification.

This invention relates to new and useful improvements in securing devices, for tool holders or tools of metal working machines and especially to provide means for securing such tool holders or tools within the heads of said machines. The object being to provide simple and effective means whereby the shank of a tool holder or tool, may be secured in a suitable socket of heads such as are commonly employed on boring and turning mills and turret lathes; to provide for adjusting the shank of such tool holders or tools both vertically and radially within the socket of a tool holding head and for firmly securing said holder or tool as against turning when in either of such adjusted positions.

Upon the accompanying drawings forming a part of this specification, similar characters of reference denote like or corresponding parts, throughout the several figures, and of which, Figure 1, shows a front elevation of a detached turret head partially broken away, and showing a tool holder secured in one of the sockets. Fig. 2, is a detached front elevation of the tool holder shown in Fig. 1. Fig. 3, shows a longitudinal sectional view through a clamping member forming a part of my securing device, and Fig. 4, is a detached plan view of the tool holder shown in Figs. 1 and 2.

In the accompanying drawing I have shown my invention as applied to a turret head having a series of sockets for the reception of tool holders or special tools, such as are commonly employed in connection with boring and turning machines and turret lathes. I have shown as attached to said head and likewise in detail a common form of tool holder which is extensively used in connection with both turret and plain heads for holding cutters of various types, but it will be obvious that special drills and other boring tools, having properly formed shanks, may be secured within turret heads of this class by means of my device.

In detail 5 represents the turret head as a whole which as shown is a six sided head having therein an equal number of cylindrical sockets 6 arranged radially with respect to the center head and adapted to receive the cylindrical shank portion 7 to be inserted therein and bearing a head 8. The upper end portion of the said shank 7 is cut away to form an abutting shoulder 9, which is designed to receive and engage a pin 10 secured in the head and extending crosswise through the inner end portion of the socket 6 before mentioned. This device obviously forms a positive preventive against the shank turning within the head, yet readily permits the said shank to be inserted or removed when not held by any other means.

In addition to the above shoulder and pin connection which is designed to hold the shank against rotary movement I provide a clamping device for holding the shank up in engagement with the pin, as is clearly shown in Figs. 1 and 3, and which comprises a two part binding plug 11 and 12 which snugly fits in the bore 13 of the head and is held against turning by a screw 19. The adjoining end and side surfaces of the plug are cut away as shown at 14 in Fig. 3, to receive and engage the periphery of the cylindrical shank 7. The pin 17 serves to insure proper alinement of the inner and outer members 11 and 12 of the plug and further prevents turning of the bolt 15. The head of bolt 15 is recessed in the inner member 11 of the plug and extends longitudinally and centrally through the two members of the plug, and is provided with a thread upon its outer end to receive the nut 18 whereby the two members may be adjusted to or from each other to engage or release the side of the shank in the manner before specified.

In the production of roughing or other heavy cuts, as by a cutting tool (not shown) through the application of my tool holder, it is necessary for the said cutting tool to be securely held, and therefore while performing such cuts the shank is designed to be engaged by the pin which positively prevents slipping. On the other hand when producing lighter or finishing cuts the tool in question may be held in a lower position from that occupied in performing said roughing cuts, and as the strain upon it is not so great it is not important that such a positive grip should be employed, therefore I may lower the shank from the position shown in Fig. 1, to that shown in dotted lines in the same figure and secure it by the binder plug without the assistance of the pin.

Having thus described my invention what I claim and desire to secure by Letters Patent is:—

1. In a tool holder securing device for lathes, the combination with a body having a cylindrical socket, of a cylindrical tool shank to fit in said socket, a binder plug arranged to grip the side of the shank, and interengaging means between the body and shank in rear of the binder plug for preventing rotation of the shank and adapted to be disengaged by longitudinal movement of the shank.

2. In a tool holder securing device for lathes, the combination with a head having a socket adapted to receive a tool shank, an intersecting opening, a divided binder plug arranged in said opening to grip the side of the shank, means for maintaining the parts of said plug in alinement, and means for preventing angular movement of the plug.

Signed at Bridgeport, in the county of Fairfield, and State of Connecticut this 10th day of April A. D., 1907.

GUSTAV H. HOLLM.

Witnesses:
C. M. NEWMAN,
E. P. BULLARD, JR.